Nov. 10, 1959    C. LUCANERA ET AL    2,912,693
OMNIDIRECTIONAL BEACON ANTENNA
Filed July 15, 1957

Inventors
CONSTANTINO LUCANERA
HOWARD AVERY

By *Percy P. Lantzy*
Attorney

United States Patent Office
2,912,693
Patented Nov. 10, 1959

2,912,693

OMNIDIRECTIONAL BEACON ANTENNA

Constantino Lucanera, Blauvelt, N.Y., and Howard Avery, Paramus, N.J., assignors to International Telephone and Telegraph Corporation, Nutley, N.J., a corporation of Maryland Application July 15, 1957, Serial No. 672,543

13 Claims. (Cl. 343—761)

This invention relates to omnidirectional beacon antennas and, more particularly, to omnidirectional beacon antennas for use in producing a multiple-modulation radiation pattern having a fundamental modulation frequency and one or more additional harmonics of the fundamental modulation frequency for use in radio navigation systems such as that commonly known as TACAN.

Omnidirectional beacon systems such as in TACAN have a high order of directional accuracy which is dependent upon the use of a directive antenna pattern rotated at a fundamental frequency and modulated by a harmonic of this fundamental frequency so as to produce a generally multilobed rotating directive radiation pattern. Due to the rotation of the multiple-modulation antenna pattern, a receiver located remotely from the transmitter receives energy which appears as an amplitude-modulated wave having a fundamental modulation component and a modulation component at a harmonic frequency of the fundamental. Both fundamental and harmonic frequency reference signals are transmitted omnidirectionally for comparison with the received components of the rotating pattern so that the receiver may determine its azimuth relative to the beacon's antenna system.

In previous antennas designed for use in such omnidirectional beacons, it has been found difficult to obtain sufficient modulation at high vertical radiation angles, while maintaining satisfactory operation at low vertical angles and over a desired frequency range.

The principal object of this invention is to provide an omnidirectional beacon antenna having sufficient modulation up to a high vertical angle over a substantial frequency band.

According to one aspect of the invention, in an antenna system in which groups of parasitic linear conductive elements are disposed for rotation about a central radiator, good modulation at high vertical angles is obtained by including a pair of slanting elements in the form of a V in each group of parasitic elements. According to a further aspect of the invention, modulation at low angles is obtained by including a vertical element between the V elements in each group of parasites.

The foregoing and other objects and features of this invention and the manner of attaining them will become more apparent and the invention itself will be best understood by reference to the following description of an embodiment of the invention taken in conjunction with the accompanying drawings comprising Figs. 1 to 4 wherein.

In the preferred embodiment of the invention, the elements are disposed above a counterpoise, and the radiator is a monopole disposed centrally over the counterpoise. Further, in the preferred embodiment the parasitic elements are placed on dielectric cylinders, with one group of parasites on an inner cylinder for fundamental modulation and a plurality of groups of parasites on an outer cylinder for harmonic modulation.

Figure 1:
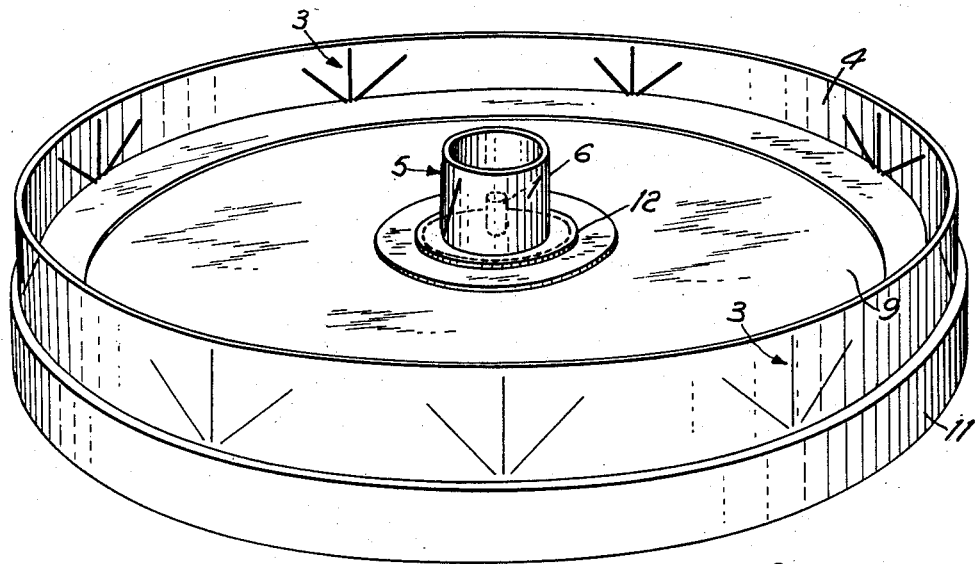
Fig. 1 is a view in perspective of one embodiment of the omnidirectional beacon system of this invention.
Figure 2:
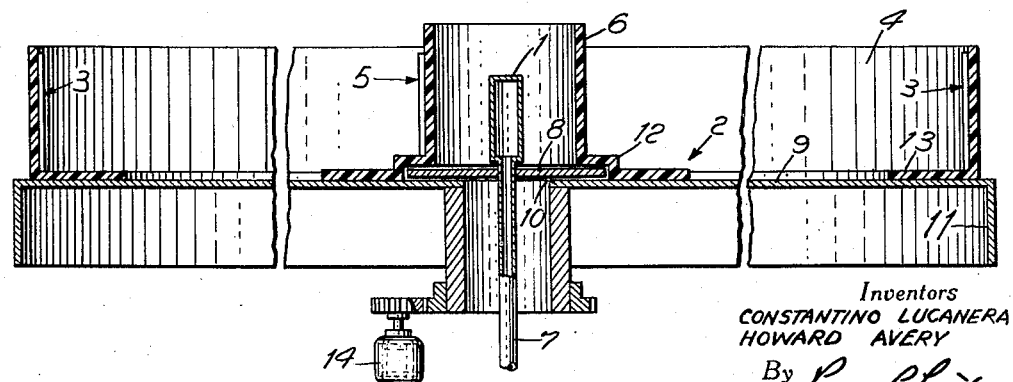
Fig. 2 is a sectional view of the embodiment of the antenna system taken along the lines 2—2 of Fig. 1.

Referring to Figs. 1 and 2 of the drawing, an antenna system for producing a rotating multilobed shaped azimuth directivity pattern comprises a central radiator 1 supported at the center of a counterpoise 2. A harmonic frequency series of parasitic elements 3 spaced at regular angular intervals are affixed to the surface of an outer rotating Fiberglas housing 4 while a fundamental frequency group of parasitic elements 5 is attached to an inner Fiberglas housing 6.

Referring more specifically to Fig. 2 of the drawing, a source of radio-frequency (R.-F.) energy is coupled to a coaxial transmission line 7. The inner conductor is coupled to a central radiator 1 which essentially comprises a quarter wavelength vertical stub antenna. A counterpoise 2 which includes an inner stationary disk 8 and an outer rotating disk 9 surrounds the central radiator and an outer rotating disk 9 surrounds the central radiator assembly. The outer conductor of transmission line 7 is coupled to disk 8. A quarter wavelength choke generally indicated at 10 is provided by over lapping disks 8 and 9 so that there is no leakage of energy as the metal disk 9 rotates. The outer edge of disk 9 has a flange 11 which acts as a radio-frequency choke to prevent undesired radiation. Surrounding the central radiator assembly 1 is an inner Fiberglas housing 6, which includes a generally horizontal portion 12 which extends over the outer edge of disk 8 and is attached to disk 9. The fundamental frequency parasitic group of elements 5 is carried by the inner Fiberglas housing 6 which rotates about the central radiator 1. Also rotating with the metal disk counterpoise 2 is an outer Fiberglas housing 4 on which a plurality of parasitic element groups 3 are carried for the harmonic modulation. Housing 4 has a horizontal flange 13 attached to disk 9. The metal disk 9 and the attached housings 4 and 6 are rotated by means of a motor 14.

The parasitic elements 3 and 5 are located on their respective housings 4 and 6 at a distance from the central radiator at which the desired radiation component of each is near a maximum, as determined by the Bessel Function expansion; and each is designed in length, resistance, and position to produce the desired radiation characteristic. Further information on TACAN may be found in "Electrical Communication," published by International Telephone and Telegraph Corporation, New York, New York, volume 33, No. 1, March 1956, with the principles of antenna design on pages 35 to 59.

In the embodiment shown here, the parasities and counterpoise disk 9 are rotated at 15 cycles per second, which is the fundamental modulation frequency produced by the single group of parasites 5 on housing 6. The parasites 3 produce the ninth harmonic of modulation at 135 cycles per second, and there are nine groups of these parasites 3 spaced at 40° intervals on housing 4.

It has been found that with vertical parasites adjusted to produce maximum modulation at low vertical angles, that the modulation level drops as the vertical angle increases beyond some value, and at angles above about 40° is too low to be useful. According to the invention, each group of parasites includes a pair of slanted elements in the form of a V to produce modulation at high angles, in combination with a vertical element for modulation at low angles. All of the elements of a group fan out with minimum spacing at the lower ends and maximum spacing at the upper ends. The modulation produced by the V elements is negligible at angles up to 10° or 20°, increases to a maximum at a value which may be between 40° and 50°, and then drops off at higher angles. A possible explanation for this may be that, for directions of azimuth in which the group of parasites is not in line with the central radiator, one of the slanted elements has its pattern directed upward. Also, in such planes, the distances to the centers of radiation of the elements become closer together as the vertical angle increases. The effect is greatest in directions of azimuth at right angles to the line of the central radiator and parasite group. This configuration does not produce any substantial horizontal polarization in the radiation pattern.

Figure 3:
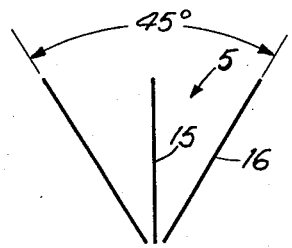
Fig. 3 is a view of a group of parasites for fundamental modulation.
Figure 4:
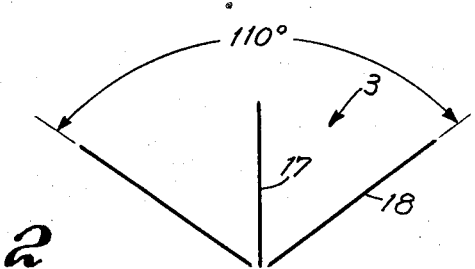
Fig. 4 is a view of one of the groups of parasites for harmonic modulation.

Referring to Fig. 3, the fundamental parasite group 5 comprises a vertical element 15 and two slanted V elements 16. Each group of harmonic parasites 3, Fig. 4, includes a vertical element 17, and a pair of slanted V elements 18. In each group, the slanting elements are symmetrically disposed on opposite sides of the vertical element, and slant away from the vertical element at equal angles therewith.

For the band of 962 to 1024 megacycles, the fundamental parasite group 5 may be on a housing 6, five inches in diameter, and the harmonic parasite groups 3 may be on a housing 4, 43 inches in diameter. The vertical elements 15 and 17 may be 4½ inches long, and the slanted elements 16 and 18 may be 5 inches long. The slanted elements 16 of the fundamental group 6 may be at an angle of 45° to each other, and the slanted elements 18 of the harmonic group 4 may be at an angle of 110° to each other. Each of the parasitic elements 15 to 18 may be made of a resistance wire such as Nichrome, having a resistivity of 400 to 700 ohms per foot, depending upon the amount of modulation desired. An antenna having the dimensions and characteristics given above will produce both fundamental and harmonic modulation over the band which is within the acceptable limits of 12 to 30 percent at vertical angles from zero to 55°.

While we have described above the principles of our invention in connection with specific apparatus, it is to be clearly understood that this description is made only by way of example and not as a limitation to the scope of our invention as set forth in the objects thereof and in the accompanying claims.

We claim:

1. An antenna system comprising a vertically disposed elongated radiator and at least one group of parasitic substantially linear conductive elements disposed for rotation about said radiator, said group of parasitic elements including a pair of said elements symmetrically disposed on opposite sides of a vertical line at a distance from said radiator and lying on the surface of a geometrical cylindrical form coaxial with said radiator, with the elements of said pair being closest together at their lowest point and slanting away from each other and said vertical line to form equal angles therewith.

2. An antenna system according to claim 1, wherein said group of parasitic elements further includes an element vertically disposed between said slanting elements.

3. An antenna system comprising an elongated vertically disposed radiator and at least one group of parasitic substantially linear conductive elements disposed for rotation about said radiator, said group of parasitic elements including a pair of said elements lying substantially in the same vertical plane at right angles to a line drawn from the central longitudinal axis of said radiator to said elements, the elements of said pair being closest to each other at one end and slanting away from each other to form equal angles with the vertical line drawn therebetween.

4. An antenna system according to claim 3, wherein said group of parasitic elements further includes an element vertically disposed between said slanting elements.

5. An antenna system comprising a vertically disposed elongated radiator, at least one dielectric cylinder disposed concentrically of said radiator, at least one group of parasitic substantially linear conductive elements carried by said cylinder, said group of parasitic elements including a pair of said elements symmetrically disposed on opposite sides of a vertical line of said cylinder, with the elements of said pair being closest together at their lowest point and slanting away from each other to form equal angles therewith, and means to rotate said cylinder about said radiator.

6. An antenna system according to claim 5, wherein said group of parasitic elements further includes an element vertically disposed between said slanting elements.

7. An antenna system according to claim 5, wherein a plurality of said groups of parasitic elements is disposed on said dielectric cylinder.

8. An antenna system according to claim 7, further including a second dielectric cylinder of a smaller diameter than the first said cylinder and disposed concentric of said radiator, and a group of said parasitic elements disposed on said second cylinder.

9. An antenna system comprising a conductive member having a planar surface, an elongated monopole radiator vertically disposed centrally of said surface, and at least one group of parasitic substantially linear conductive elements disposed for rotation about said radiator, said group of parasitic elements including a pair of said elements symmetrically disposed on opposite sides of a vertical line at a distance from said radiator and lying on the surface of a geometrical cylindrical form coaxial with said radiator, with the elements of said pair being closest together at their lowest point and slanting away from each other and said vertical line to form equal angles therewith.

10. An antenna system according to claim 9, wherein said group of parasitic elements further includes an element vertically disposed between said slanting elements.

11. An antenna system according to claim 9, further including a dielectric cylinder concentric with said radiator and carried by said conductive member, said group of parasitic elements being disposed on said dielectric cylinder.

12. An antenna system according to claim 11, wherein a plurality of said groups of parasitic elements is disposed on said dielectric cylinder.

13. An antenna system according to claim 12, further including a second dielectric cylinder carried by said conductive member of a smaller diameter than the first said cylinder and disposed concentric of said radiator, and a group of said parasitic elements disposed on said second cylinder.

No references cited.